United States Patent
Goslar et al.

(10) Patent No.: US 6,658,927 B1
(45) Date of Patent: Dec. 9, 2003

(54) TIRE SENSOR

(75) Inventors: Marius Goslar, Braunschweig (DE); Hans-W. Bleckmann, Bad Nauheim (DE)

(73) Assignees: Continental Teves AG & Co. OHG, Frankfurt (DE); Continental AG Vehrenwalder, Hannover (DE)

( * ) Notice: Subject to any disclaimer, the term of this patent is extended or adjusted under 35 U.S.C. 154(b) by 0 days.

(21) Appl. No.: 10/088,197

(22) PCT Filed: Sep. 14, 2000

(86) PCT No.: PCT/EP00/08991

§ 371 (c)(1),
(2), (4) Date: Aug. 14, 2002

(87) PCT Pub. No.: WO01/19656

PCT Pub. Date: Mar. 22, 2001

(30) Foreign Application Priority Data

Sep. 15, 1999 (DE) .......................... 199 44 094
May 26, 2000 (DE) .......................... 100 26 110
Sep. 7, 2000 (DE) .......................... 100 44 287

(51) Int. Cl.$^7$ ............................................. G01M 17/02
(52) U.S. Cl. ........................................ 73/146; 73/146.5
(58) Field of Search ............................... 73/146–146.8; 340/442–448

(56) References Cited

U.S. PATENT DOCUMENTS

| 4,618,940 A | 10/1986 | Schmitt |
| 6,389,895 B2 * | 5/2002 | Colarelli et al. ............... 73/462 |

FOREIGN PATENT DOCUMENTS

| DE | 32 02 339 | 8/1983 |
| DE | 40 33 740 | 4/1992 |
| DE | 44 09 708 | 9/1995 |
| DE | 44 34 180 | 3/1996 |
| DE | 44 35 160 | 4/1996 |
| DE | 196 20 582 | 12/1997 |
| DE | 196 26 843 | 1/1998 |
| DE | 199 04 818 | 8/2000 |
| EP | 0626562 | 11/1994 |
| EP | 0 828 161 | 3/1998 |
| GB | 1590620 | 6/1981 |

OTHER PUBLICATIONS

Search Report of the German Patent Office for Appln 10044287.0.

* cited by examiner

*Primary Examiner*—Edward Lefkowitz
*Assistant Examiner*—Jermaine Jenkins
(74) *Attorney, Agent, or Firm*—Rader, Fishman & Grauer PLLC

(57) ABSTRACT

The present invention relates to a tire sensor, especially tire sidewall torsion sensor (=SWT sensor), including at least two pick-ups for measuring data being mounted at a distance from the tire rotational axis on the chassis, the said pick-ups for measuring data interacting with at least one encoder mounted on or in the tire wall or with at least one conventional encoder mounted on or in the tire wall and exhibiting poles, wherein the output signals or output information of such pick-ups for measuring data sensors are/is transmitted to the motor vehicle control system.

In order to send the signals provided by the tire sensor to an evaluation unit or the motor vehicle control system in a fashion rid of errors that are due to influence quantities, at least one analog and at least one digital signal conditioning and/or processing unit is provided between the motor vehicle control system and the pick-ups for measuring data, the pick-ups for measuring data send at least two output signals that can be evaluated with respect to a change in the phase position and/or at least one output signal that can be evaluated with respect to the change of the amplitude to the digital signal-conditioning and/or processing unit, and the digital signal-conditioning and/or processing unit calibrates the systematic errors of the output signals with respect to whether the error is an amplitude-related error or a phase-related error.

13 Claims, 7 Drawing Sheets

TIRE SENSOR

The present invention relates to a tire sensor, especially tire sidewall torsion sensor=SWT sensor, including at least two pick-ups for measuring data being mounted at a distance from the tire rotational axis on the chassis, the said pick-ups for measuring data interacting with at least one encoder mounted on or in the tire wall or with at least one conventional encoder mounted on or in the tire wall and exhibiting poles, wherein the output signals or output information of such pick-ups for measuring data sensors are/is transmitted to the motor vehicle control system.

Many methods and devices using tire sensors for detecting the forces and torque acting on the tires are known for controlling the driving performance of a motor vehicle. Tire sensors (SWT sensors) consist of one encoder mounted in or on the tire and at least one pick-up for measuring data that is mounted on the chassis in a stationary manner and associated with the encoder. Whereas EP 04 441 09 B1 proposes monitoring the deformation of the range of the tire profile, i.e., the tire contact area, WO 96/10505 proposes detecting the deformation of the sidewall of a tire—the torsion deformation—by measuring a period of time that elapses between the passing of at least two markings arranged on the rotating wheel at a different radius in relation to the rotational axis. The longitudinal forces that act on the tire are inferred from the evaluation of the signals obtained as described above. In addition, the transverse forces may be determined from variations of the amplitudes of the signal sensed by the pick-up for measuring data which represents changes in the distance between the pick-up for measuring data and the encoder. A tire sensor which detects a change in the phase position between output signals emitted by pick-ups for measuring data when the tire is deformed due to forces acting on the tire is described in WO 97/44673.

Further, a method is disclosed in WO 99/19192 which, on the basis of the forces that act on the individual wheels and are sensed by tire sensors, determines condition variables of the vehicle which satisfy the high demands placed on motor vehicle control systems in terms of accuracy and reliability.

An object of the present invention is to send the signals provided by the tire sensor to an evaluation unit or the motor vehicle control system rid of errors that are due to influence quantities.

According to the present invention, this object is achieved by a generic tire sensor with the special characteristics that at least one analog and at least one digital signal conditioning and/or processing unit are provided between the motor vehicle control system and the pick-ups for measuring data, that the pick-ups for measuring data send at least two output signals that can be evaluated with respect to a change in the phase position and/or at least one output signal that can be evaluated with respect to the change of the amplitude to the digital signal-conditioning and/processing unit, and that the digital signal-conditioning and/or processing unit calibrates the systematic errors of the output signals with respect to whether the error is an amplitude-related error or a phase-related error.

The tire sensor of the present invention and a control based thereon, hence, founds on the forces that occur directly at the tire. This permits detecting all influence quantities and wrong interpretations which are due to ambiguous signals or errors in processing what impairs the determination of vehicle condition variables or quantities describing the vehicle behavior. An error quantity which is on the basis of the respective electric characteristic quantities and is caused by different influence quantities is taken into consideration by the calibration of the generally sinusoidal signals, provided by the pick-up(s) for measuring data with respect to the signals' electric characteristic quantity. The envisaged signal-conditioning and/or processing unit reduces the quantity of data of several interlinked analog input signals in a favorable manner so that further processing of the information obtained is ensured with reduced effort and structure in the digital signal processing. In this arrangement, the changes of the amplitude, the period duration, and the phase relation of the input signals permits obtaining the information which render it possible to calculate the transverse and longitudinal forces that act on the tires. The signal-conditioning and/or processing unit comprises a means to detect undesirable error quantities and to compensate them numerically in the subsequent data processing operation.

In a favorable embodiment of the present invention, the amplitude-related error is compensated by a multiplicative calibration and the phase-related error is compensated by an additive calibration in the digital signal-conditioning and/or processing unit. According to the present invention, the amplitude-related output signal is rectified and the maximum values (amplitudes) determined in the analog signal-conditioning unit, while in the digital signal-conditioning and/or processing unit the offset is determined by way of averaging the maximum values with correct signs and a multiplier f is formed of the maximum value divided by the mean value of the rectified signal and assigned to each output signal or each pole of the encoder. Associated with the phase-related output signal of the tire sensor is, according to the present invention, an ideal pole pattern which corresponds to the number of poles and preferably has equidistant poles. In the digital signal-conditioning and/or processing unit, the ideal pole pattern is compared to each pole of the encoder of the phase-related output signal. In dependence on the comparison, correction factors are then formed or updated which are associated additively with the output signal according to the present invention.

Thus, the present invention is based on the knowledge that the correction of the amplitude error can be based on; the assumption that the error is a multiplicative error because additive air slot variations (error: Δ) or tire sidewall equalities can be presupposed which, by way of the exponential characteristic curve
|Amplitude−Offset|=A*exp(B*air slot) become a multiplicative amplitude variation:

|Amplitude−Offset|=$A^*\exp(B^*(\text{air slot}+\Delta))$

|Amplitude−Offset|=$A^*\exp(B^*\text{air slot}+\Delta')$

|Amplitude−Offset|=$A^*\exp(B^*\text{air slot})^* \exp(\Delta')$

|Amplitude−Offset|=$A^*\exp(B^*\text{air slot})^* \Delta''$ and a multiplicative inequality of the magnetic field is presupposed which is directly proportional to the amplitude and thereby generates a multiplicative inequality of the amplitude.

The correction of the pole division error, however, is based on the assumption that the pole division error is an additive error because it is an angle error which changes additively over the periphery of the encoder 17.

Favorably, the amplitudes and phase differences are stored in a ring memory for error correction, corresponding to the pole number, such as 1, 2, . . . to 96.

The calibration of the present invention permits immediately correcting errors that occur periodically on a wheel, without the need for effecting a time-consuming (delay time) filtering operation. It was found out in tests that the accuracy of signal evaluation can be enhanced by up to 7 percent due to the calibration.

An embodiment of the present invention will be described in detail hereinbelow by making reference to the accompanying drawings.

Figure 1:
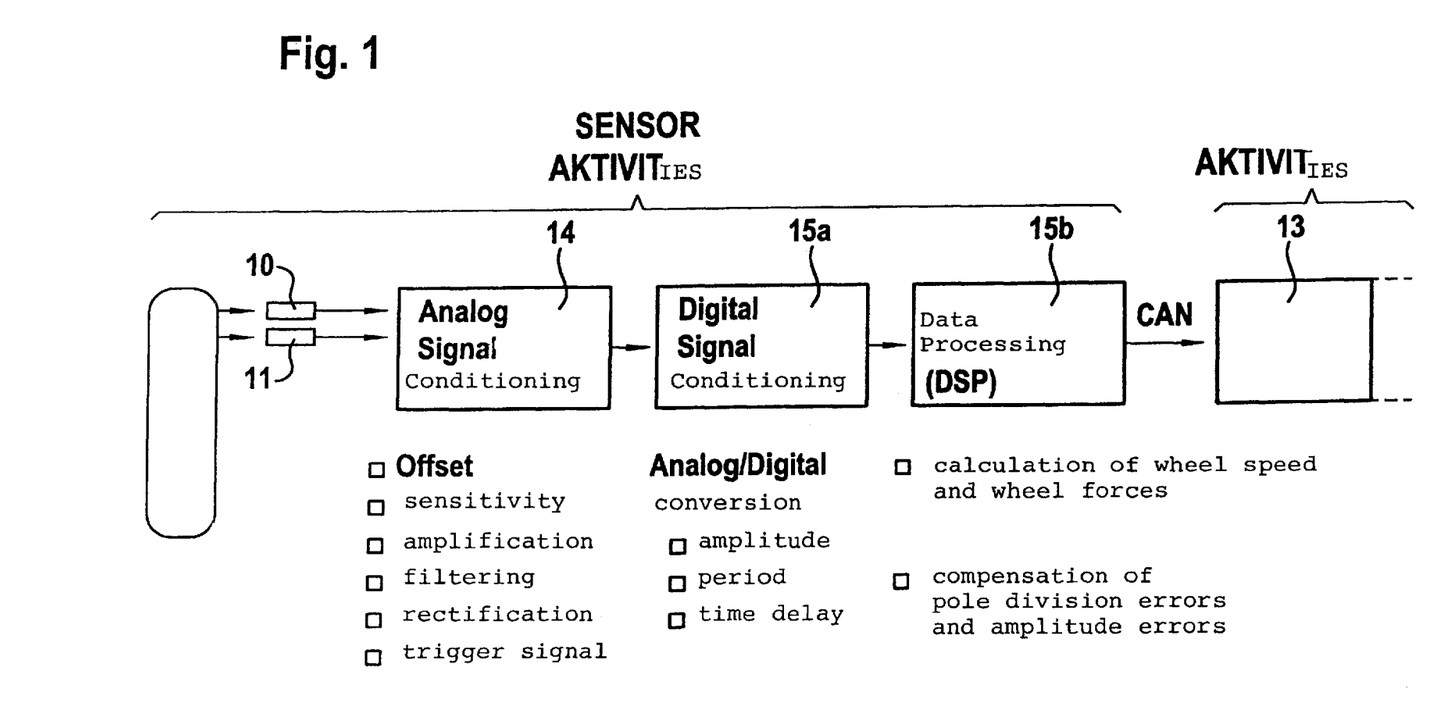
FIG. 1 is a schematic wiring diagram of the SWT-signal-conditioning and processing unit.

The circuit illustrated in the FIG. 1 embodiment comprises the following function groups:

analog signal conditioning 14 digital signal conditioning 15a digital signal or data processing 15b (DSP=digital signal processor)

CAN interface providing a connection to the motor vehicle control system 13.

In the analog signal conditioning, the sinusoidal output current signals of the SWT pick-ups for measuring data 10, 11 are transferred into a voltage and converted into a squarewave signal, filtered, adapted to changes of the signal offset of the sensors, and the peak value of every half wave is detected.

In the digital signal conditioning 15a, the analog signals are converted to digital signals with respect to the amplitude, the period, and the time delay.

In the digital signal or data processing 15b, the wheel speed and wheel forces are determined. In addition, pole division errors and amplitude errors are compensated.

Figure 2:
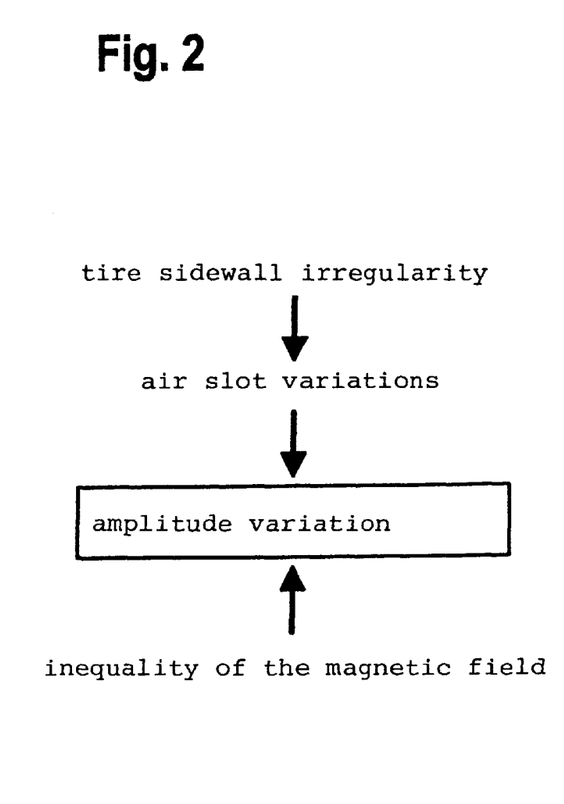
FIG. 2 is a schematic representation of the causes of the amplitude error.
Figure 3:
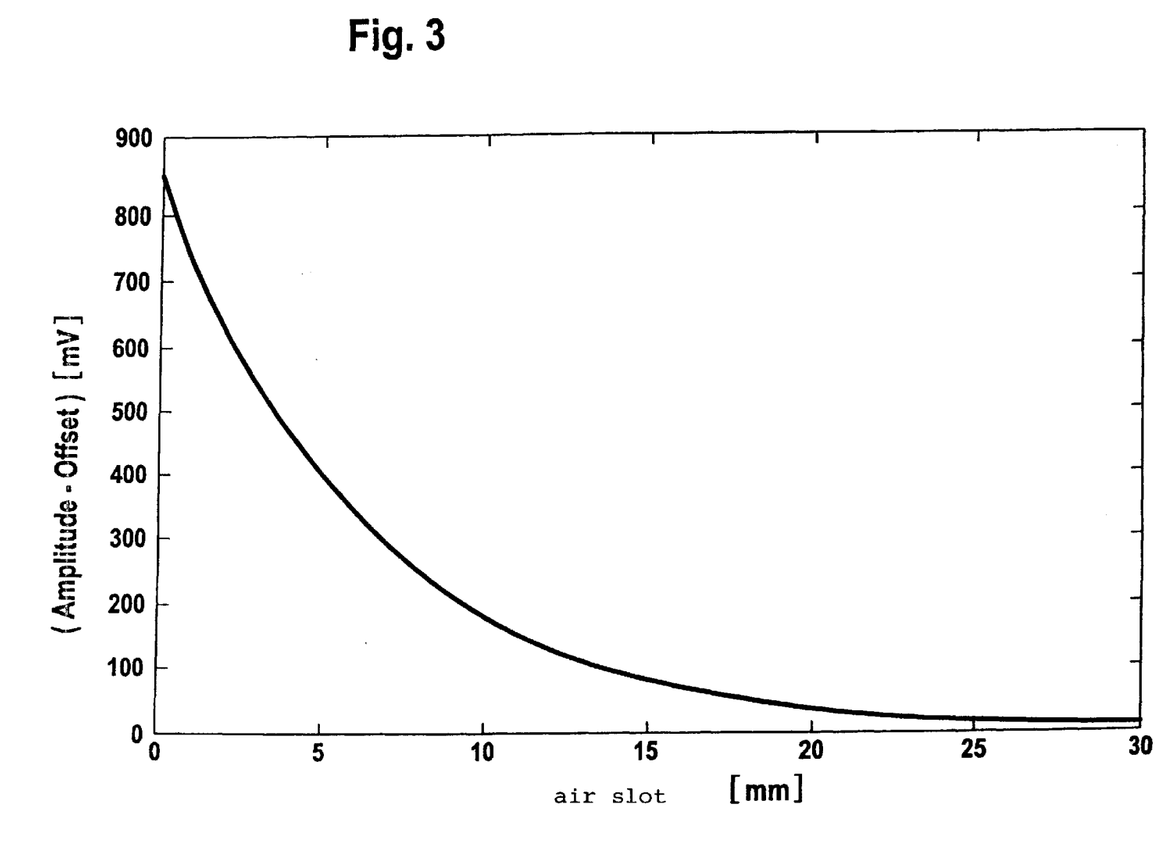
FIG. 3 shows in a characteristic curve the dependence of the amount of the output signal amplitude on the air slot.
Figure 4:
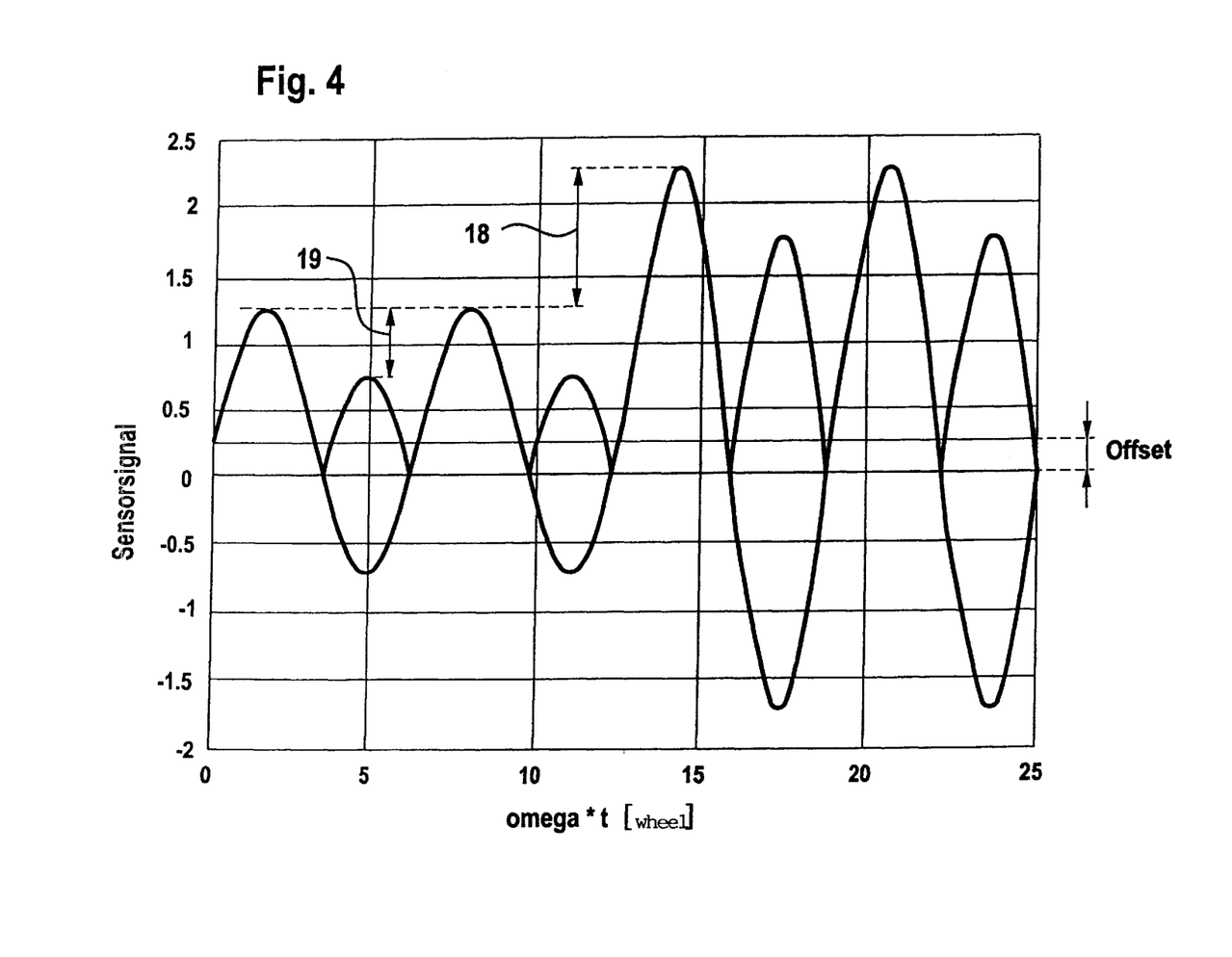
FIG. 4 is a representation of the amplitude error by an offset (d-c component) and by irregularity.

The amplitude errors are due to an irregularity of the tires in a lateral direction. FIG. 2 shows the tire sidewall irregularity schematically as an undulated line 16. The tire sidewall irregularity causes variations of the air slot between the pick-ups for measuring data (sensors) 10 and, respectively, 11 which are attached stationarily on the chassis at a distance from the axis of rotation of the wheel or the tire, and the encoder 17 arranged in the tire sidewall (FIG. 5), which irregularity does not occur under the effect of forces acting on the tire. Rather, there is a periodic change in distance on a wheel which correlates with the amplitude detected by the analog signal conditioning 14. The correlation between the amplitude and the air slot or distance between the pick-ups for measuring data 10, 11 and the encoder 17 is depicted in FIG. 3, the air slot being plotted in millimeters (mm) on the abscissa and the amplitude being plotted in Milli volt (mV) on the ordinate, rid of a d-c component (offset). Another amplitude error is based on the irregularity of; the magnetization of the tire sidewall over the periphery of the sidewall so that an additional wheel periodic variation of the amplitude is produced due to the irregularity of the magnetic field or the change in the magnetic field strength indicated in FIG. 2. Further, an amplitude error may develop from the fact that the output signal comprises an a-c component and a d-c component 19 (offset) which is filtered out in the analog signal conditioning 14. The amplitude is obtained from the residual a-c component by rectification with a subsequent determination of the maximum value. It is possible to determine the offset stationarily to an insufficient degree or with time delay. In that case, the maximum values of the half waves (amplitudes) are different due to the irregularity component 18 (FIG. 4).

Figure 5:
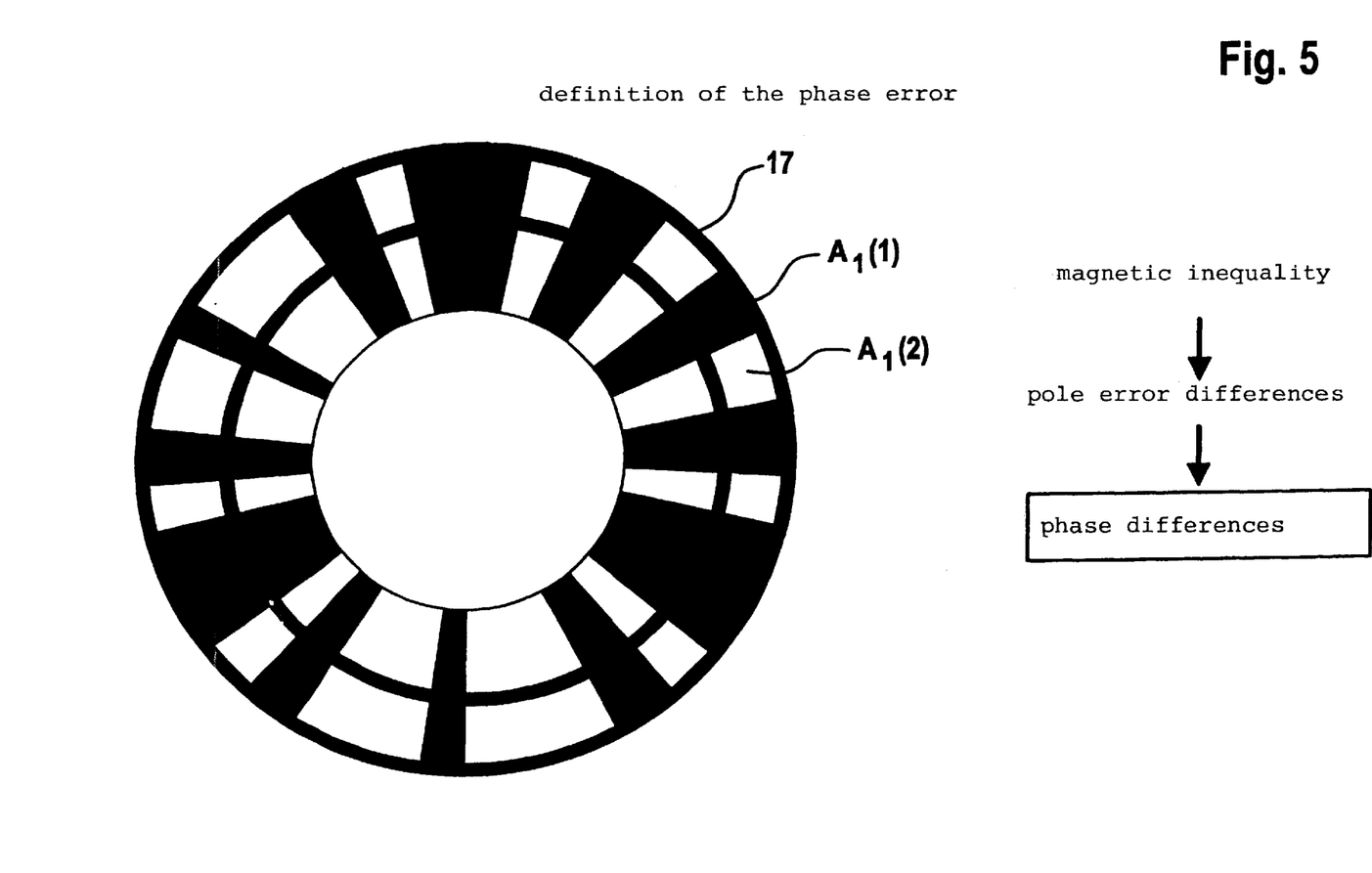
FIG. 5 is a representation of the error in the phase difference.
Figure 6:
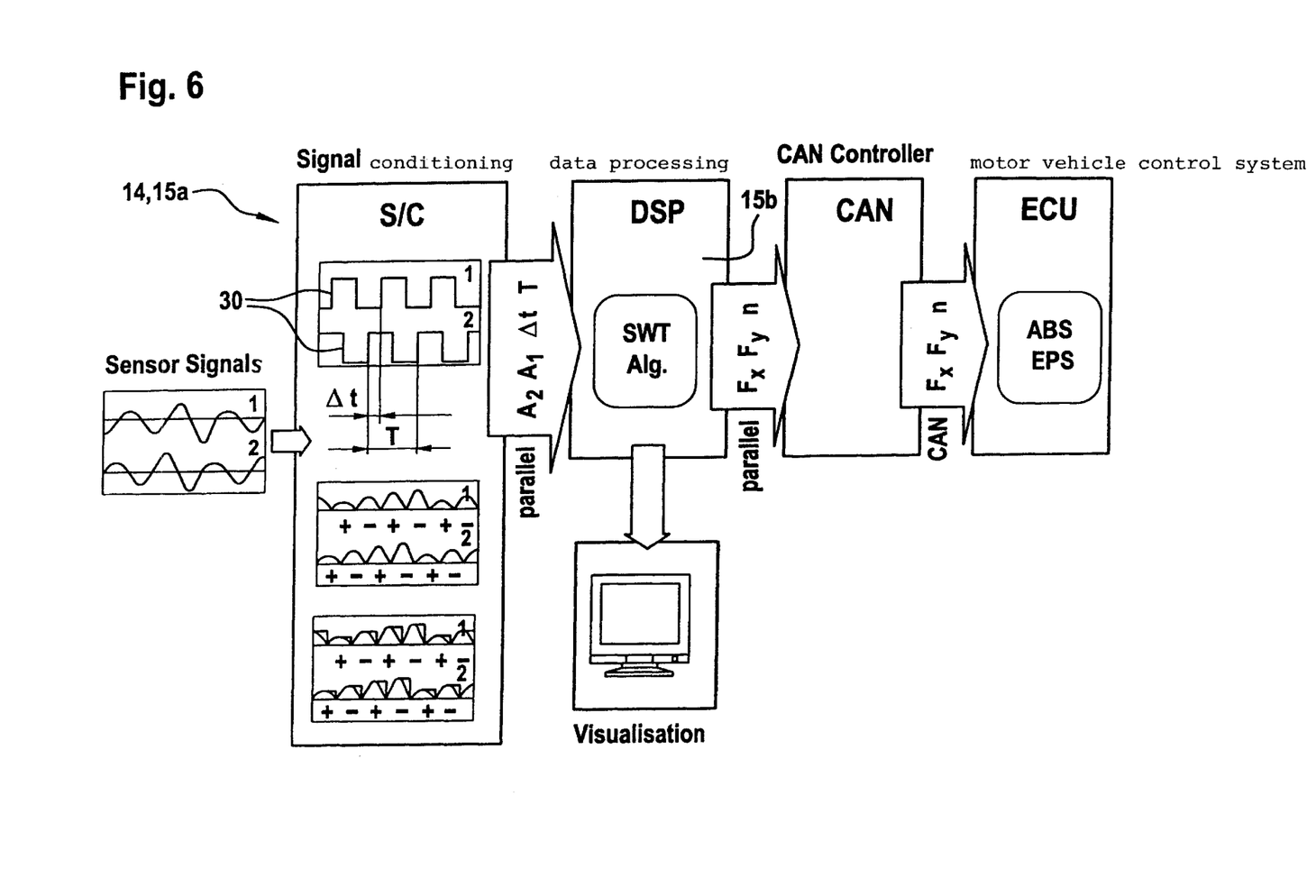
FIG. 6 shows the signal flow between the signal-conditioning and processing and the motor vehicle control system.

Phase errors are due to a deviation of the applied magnetization from the ideal pole pattern, which is based on a uniform (equidistant) distribution of the poles of the encoder 17 over the periphery of the tire sidewall. This applies to assemblies which include one tire sensor and one conventional sensor or two tire sensors with two pick-ups for measuring data 10, 11.

The errors of the output signal of the pick-ups for measuring data 10, 11 are corrected as follows:

The calibration or initialization of the error correction is effected when the driving behavior is stationary. The stationary driving behavior is determined by means of input quantities which are furnished by conventional sensors and e.g. comprise the transverse and longitudinal acceleration variation and the yaw rate acceleration. Suitably, no or only very small force variations act on the wheel or the tire at this time. The following conditions can be made the basis for a stationary driving behavior:

|transverse and longitudinal acceleration variation|<0,05 g/s

|yaw rate acceleration|<5 degrees/s$^2$

When the conditions are satisfied, the calibration of the output signal may be performed.

In a ring memory of the digital signal conditioning 15a, the amplitudes $A_1$, $A_2$ and the phase difference $\Delta\phi$ during a stationary driving behavior are memorized according to the following table:

| Pole Number | 1 | 2 | 3 | .. | 96 |
|---|---|---|---|---|---|
| $A_1$ | $A_1$ (1) | $A_1$ (2) | $A_1$ (3) | .. | $A_1$ (96) |
| $A_2$ | $A_2$ (1) | $A_2$ (2) | $A_2$ (3) | .. | $A_2$ (96) |
| $\Delta\phi$ | $\Delta\phi$ (1) | $\Delta\phi$ (2) | $\Delta\phi$ (3) | .. | $\Delta\phi$ (96) |

In the preferred design, the encoder 17 has 48 pole pairs, i.e., 96 poles. In the pole memory, the pole-related error is assigned to the respective pole of encoder 17. This assignment of the pole-related error to the associated pole is maintained in the event of a change of direction of the vehicle by way of a synchronization of the correction pattern to the current;pole pattern. Encoders 17 with a different pole number may of course be used corresponding to the embodiment.

The difference in phases between the bottom pick-up for measuring data 10 or a conventional sensor arranged closer to the axis of rotation of the wheel or the tire and the top pick-up for measuring data 11 arranged more remote from the axis of rotation of the wheel or tire is considered as phase difference. To compensate the phase error, the mean value of the phase differences over one wheel rotation is produced according to the following relation:

$$\Delta\varphi_{mean} = \frac{\sum \Delta\varphi(i)}{96} \quad i = 1 \ldots 96$$

To this end, the current ring memory in copied in a second ring memory with the designation $\Delta\phi_0$: second ring memory

| $\Delta\phi_0$ | $\Delta\phi_0$ (1) | $\Delta\phi_0$ (2) | $\Delta\phi_0$ (3) | . . | $\Delta\phi_0$ (96) |
|---|---|---|---|---|---|
| | | ↓ | | | |

The second ring memory is related to the mean value:
second ring memory

| $\Delta\phi_A$ | $\Delta\phi_0$ (1) − $\Delta\phi_{mean}$ | $\Delta\phi_0$ (2) − $\Delta\phi_{mean}$ | $\Delta\phi_0$ (3) − $\Delta\phi_{mean}$ | . . | $\Delta\phi_0$ (96) − $\Delta\phi_{mean}$ |
|---|---|---|---|---|---|

The additive phase error is then contained in the second ring memory according to the following relation or replaces the ring memory $\Delta\phi_0$ which then contains the mean value of the phase difference during a wheel rotation:

$$\Delta\phi_A = \Delta\phi_0 - \Delta\phi_{mean}$$

wherein $\Delta\phi_A$=additive phase error, $\Delta\phi_0$=values in the second ring memory.

In the following correction cycles, the phase error is corrected by a modification of the phase differences ($\Delta\phi^*$) which are used for the further calculations according to the following relation:

$$\Delta\phi^*(i) = \Delta\phi(i) - \Delta\phi_A(i) = \Delta\phi(i) - \Delta\phi_0(i) + \Delta\phi_{mean} \quad i=1 \ldots 96$$

The correction of the amplitude error in the presence of a stationary driving behavior is based on the condition that the sign in the amplitude information is taken into account and that uneven pole numbers pertain to the positive half wave (A(2*i+1)>0, i=0 . . . 48) and the even pole numbers pertain to the negative half waves (A(2*i)<0, i=0 . . . 48). The compensation of the amplitude error is effected in three steps:

1. detecting the error of the d-c component (offset)
2. detecting the error of the irregularity component
3. compensation of the error(s)

The compensation of the amplitude error of the amplitude $A_1$ will be described in the following. Amplitude $A_2$ shall be treated correspondingly.

The current ring memory $A_1$ is copied into a second ring memory with the designation $A_{(0)}$:
second ring memory

| $A_{(0)1}$ | $A_{(0)1}$ (1) | $A_{(0)1}$ (2) | $A_{(0)1}$ (3) | . . | $A_{(0)1}$ (96) |
|---|---|---|---|---|---|

Because the amplitude contains the correct sign, the d-c component of a period can be found by summing two subsequent amplitudes A(2*i+1) and A(2*i+2) or the difference of two subsequent amplitudes |A(2*i+1)| and |A(2*i+2)|. The d-c component $A_{offset}$ over the total tire periphery may then be determined according to the following relation:

$$A_{Offset} = \frac{\sum A_0(i)}{96} \quad i = 1 \ldots 96$$

The second ring memory $A_0$ is now replaced by the ring memory $a_0$ which contains the amount of the amplitude compensated by the offset according to the following relation:

$$a_0(i) = |A_0(i) - A_{offset}| \quad i=1 \ldots 96$$

second ring memory

| $a_{(0)1}$ | $|a_{(0)1}(1) - A_{Offset}|$ | $|a_{(0)1}(2) - A_{Offset}|$ | $|a_{(0)1}(3) - A_{Offset}|$ | . . | $|a_{(0)1}(96) - A_{Offset}|$ |
|---|---|---|---|---|---|

A multiplicative change of the calculation is made the basis when determining the amplitude error due to the irregularity of the tire sidewall 16 and the magnetization (different field strength) of the encoder 17. The mean value of the irregularity over a wheel rotation is calculated according to the following relation:

$$a_{mean} = \frac{\sum a_0(i)}{96} \quad i = 1 \ldots 96$$

Figure 7:
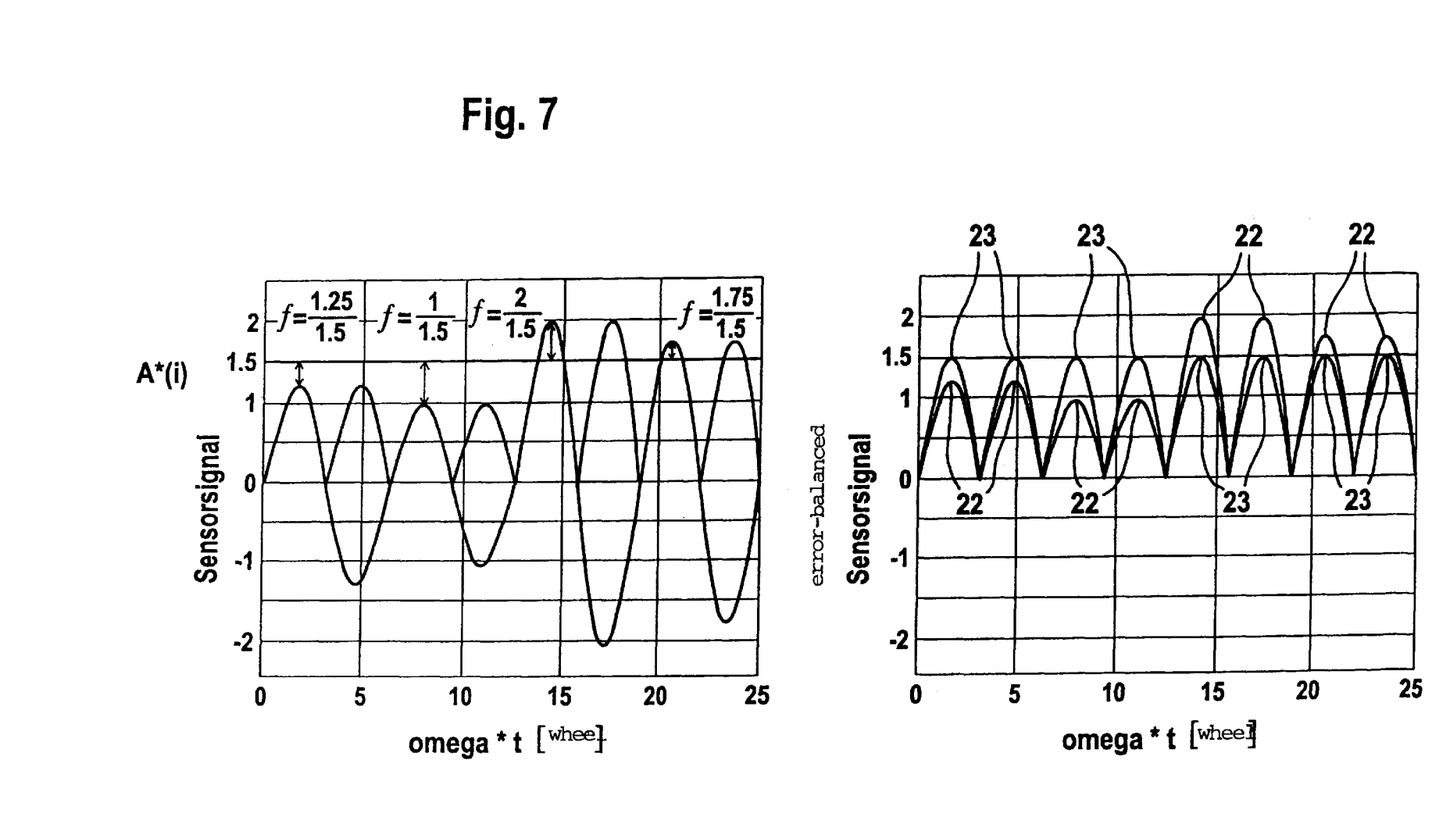
FIG. 7 shows the principle of the compensation of offset and irregularity errors.

The multiplicative error is calculated from the difference between the amount compensated by the offset and the mean value according to the following relation illustrated in FIG. 7.

$$f(i) = \frac{a_0}{a_{mean}} = \frac{|A_0(i) - A_{Offset}|}{a_{mean}} \quad i = 1 \ldots 96$$

The second ring memory $a_0$ is replaced by the multiplicative error f(i) or, respectively, the multiplicative error is copied into the second ring memory.

| f | $f_1$ (1) | $f_1$ (2) | $f_1$ (3) | . . | $f_1$ (96) |
|---|---|---|---|---|---|

As shown in the representation in FIG. 7, the amplitudes A(i) that include errors are then replaced by the amount of the amplitudes A*(i) rid of the offset error and irregularity error according to the following relation:

$$A^*(i) = \frac{|A(i) - A_{Offset}|}{f(i)} \quad i = 1 \ldots 96$$

In FIG. 7, right-hand diagram, the error-compensated output signal is plotted on the ordinate, and the angular frequency is plotted against time on the abscissa. The offset-corrected output signals are designated by reference numeral 22 and the signals rid of offset and irregularity errors have been assigned reference numeral 23.

A long-time filtering of the correction terms is provided according to a favorable embodiment. Interferences and influences, if any, are minimized by filtering with a low-pass filter. The correction with a discreet low-pass filter is carried out according to the following relation:

$$f(k) = 1/(1+FC)*(FC*f(k-1)+u(k)), \text{ wherein}$$

f(k)=filtered value of f at the point of time $t_k$,
f(k−1)=filtered value of f at the time $t_{k-1}$,
u(k)=value of f at the time $t_k$ and
FC=filter constant (FC>0).

According to another embodiment, the multiplicative error term is changed so that the amplitude is standardized. The mean value $a_{mean}$ is then set to equal 1 so that $$f(i) = \frac{a_0}{1} = |A_0(i) - A_{Offset}| \quad i = 1 \ldots 96$$

applies.

Correspondingly, a standardization of the phase difference may favorably be achieved in that the mean value is set to $\Delta\phi_{mean}=0$ so that $$\Delta\phi_A = \Delta\phi_0 - \Delta\phi_{mean}\Delta\phi_{mean} = 0$$

$$\Delta\phi_A = \Delta\phi_0$$

applies.

The amplitude and the phase difference are preferably standardized when the driving behavior is stationary under the following conditions:

|transverse acceleration|<0.07 g
|longitudinal acceleration|<0.1 g
|steering angle|<1°
steering angle velocity<20[degree/s]
forward driving
gearshift-dependent speed

| | |
|---|---|
| first gear | <10 km/h |
| second gear | <30 km/h |
| third gear | <50 km/h |
| fourth gear | <100 km/h |
| fifth gear | <150 km/h |

When these conditions are satisfied and remain stable for roughly 70 msec, a stationary driving behavior free from longitudinal or transverse forces prevails.

What is claimed is:

1. Tire sensor system, comprising:
   at least two pick-ups for measuring data from a rotating tire,
   a motor vehicle control system, wherein said measured data includes at least one analog signal and at least one digital signal,
   a conditioning and processing unit coupled between the motor vehicle control system and the pick-ups for conditioning and processing the measured data, wherein at least one of the signals contains tire related data in its phase and at least one of the signals contains tire related data in its amplitude, and
   wherein the conditioning and processing unit couples output information to said motor vehicle control system and calibrates the systematic errors of the output information with respect to whether an error in the measured data is an amplitude-related error or a phase-related error,
   wherein the amplitude-related error is compensated by a multiplicative calibration and the phase-related error is compensated by an additive calibration in the conditioning and processing unit.

2. Tire sensor as claimed in claim 1, wherein the conditioning and processing unit includes an analog signal-conditioning unit and wherein said analog signal is generally sinusoidal.

3. Tire sensor as claimed in claim 1, wherein the conditioning and processing unit includes an analog signal-conditioning unit, and wherein the amplitude-related output signal is rectified in the analog signal-conditioning unit and a maximum value is determined, and wherein in the conditioning or processing unit includes a digital signal conditioning unit, which calculates an offset by way of averaging the maximum values with correct signs, and wherein a multiplier f is formed of the maximum value divided by the mean value of the rectified signal.

4. Tire sensor as claimed in claim 3, wherein the tire includes a number of poles, and wherein the number of poles is associated with the phase-related output signal of the tire sensor, wherein the digital signal-conditioning and processing unit compares the phase-related output signal to an ideal pole pattern, and wherein, in dependence on the comparison, correction factors are formed or updated which are associated additively with the output signal.

5. Tire sensor as claimed in claim 4, wherein the ideal pole pattern has equidistant poles.

6. Tire sensor as claimed in claim 4, wherein the correction factors are stored in a memory of the digital signal-conditioning or processing unit.

7. Tire sensor as claimed in claim 1, wherein the calibration of the amplitude-related errors or phase-related errors is effected during stationary driving behavior.

8. Tire sensor system, comprising:
   at least two pick-ups for measuring data from a rotating tire,
   a motor vehicle control system, wherein said measured data includes at least one analog signal and at least one digital signal,
   a conditioning and processing unit coupled between the motor vehicle control system and the pick-ups for conditioning and processing the measured data, wherein at least one of the signals contains tire related data in its phase and at least one of the signals contains tire related data in its amplitude, and
   wherein the conditioning and processing unit couples output information to said motor vehicle control system and calibrates the systematic errors of the output information with respect to whether an error in the measured data is an amplitude-related error or a phase-related error,
   wherein the conditioning and processing unit includes an analog signal-conditioning unit and wherein said analog signal is generally sinusoidal.

9. Tire sensor system, comprising:
   at least two pick-ups for measuring data from a rotating tire,
   a motor vehicle control system, wherein said measured data includes at least one analog signal and at least one digital signal,
   a conditioning and processing unit coupled between the motor vehicle control system and the pick-ups for conditioning and processing the measured data, wherein at least one of the signals contains tire related data in its phase and at least one of the signals contains tire related data in its amplitude, and
   wherein the conditioning and processing unit couples output information to said motor vehicle control system and calibrates the systematic errors of the output information with respect to whether an error in the measured data is an amplitude-related error or a phase-related error,
   wherein the conditioning and processing unit includes an analog signal-conditioning unit, and wherein the amplitude-related output signal is rectified in the analog signal-conditioning unit and a maximum value is determined, and wherein in the conditioning or processing unit includes a digital signal conditioning unit, which calculates an offset by way of averaging the maximum values with correct signs, and wherein a multiplier f is formed of the maximum value divided by the mean value of the rectified signal.

10. Tire sensor as claimed in claim 9, wherein the tire includes a number of poles, and wherein the number of poles is associated with the phase-related output signal of the tire sensor, wherein the digital signal-conditioning and processing unit compares the phase-related output signal to an ideal pole pattern, and wherein, in dependence on the comparison, correction factors are formed or updated which are associated additively with the output signal.

11. Tire sensor as claimed in claim 10, wherein the ideal pole pattern has equidistant poles.

12. Tire sensor as claimed in clam 10, wherein the correction factors are stored in a memory of the digital signal-conditioning or processing unit.

13. Tire sensor system, comprising:

at least two pick-ups for measuring data from a rotating tire, a motor vehicle control system, wherein said measured data includes at least one analog signal and at least one digital signal, a conditioning and processing unit coupled between the motor vehicle control system and the pick-ups for conditioning and processing the measured data, wherein at least one of the signals contains tire related data in its phase and at least one of the signals contains tire related data in its amplitude, and wherein the conditioning and processing unit couples output information to said motor vehicle control system and calibrates the systematic errors of the output information with respect to whether an error in the measured data is amplitude-related error or a phase-related error, wherein the calibration of the amplitude-related errors or phase-related errors is effected during stationary driving behavior.

* * * * *